United States Patent
Hanson et al.

(10) Patent No.: US 10,896,046 B2
(45) Date of Patent: Jan. 19, 2021

(54) MANAGEMENT PROCESSOR USING CODE FROM PERIPHERAL DEVICE

(71) Applicant: Hewlett Packard Enterprise Development LP, Houston, TX (US)

(72) Inventors: Thomas Hanson, Ft. Collins, CO (US); Justin E. York, Cypress, TX (US); Kenneth C. Duisenberg, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/781,512

(22) PCT Filed: Apr. 29, 2016

(86) PCT No.: PCT/US2016/029940
§ 371 (c)(1),
(2) Date: Jun. 5, 2018

(87) PCT Pub. No.: WO2017/188970
PCT Pub. Date: Nov. 2, 2017

(65) Prior Publication Data
US 2018/0275998 A1      Sep. 27, 2018

(51) Int. Cl.
*G06F 9/4401* (2018.01)
*G06F 9/54* (2006.01)
(Continued)

(52) U.S. Cl.
CPC ............ *G06F 9/4411* (2013.01); *G06F 3/038* (2013.01); *G06F 9/54* (2013.01); *G06F 9/547* (2013.01);
(Continued)

(58) Field of Classification Search
CPC ...... G06F 9/4411; G06F 9/547; G06F 13/124; G06F 3/038; G06F 9/54; G06F 2203/0383
See application file for complete search history.

(56) References Cited

U.S. PATENT DOCUMENTS 6,269,481 B1    7/2001  Perlman
6,754,725 B1    6/2004  Wright et al.
(Continued)

FOREIGN PATENT DOCUMENTS

CN          1252951           5/2000
WO      WO-2008063830         5/2008

OTHER PUBLICATIONS

PCT; "Notification of Transmittal of the International Search Report and the Written Opinion of the International Searching Authority, or the Declaration"; cited in Appl. No. PCT/US2015/029940 dated Jan. 19, 2017; 11 pages.

(Continued)

*Primary Examiner* — Syed A Roni
(74) *Attorney, Agent, or Firm* — Trop, Pruner & Hu, P.C.

(57) ABSTRACT

A management processor includes a peripheral identifier to identify a peripheral device installed in a computing device. The management processor also includes a code retriever to receive management code from the peripheral device. The management processor also includes a code executor to execute the management code to provide, at the management processor, a management application programming interface (API) accessible by a remote client to manage the peripheral device, the remote client being external to the management processor.

20 Claims, 10 Drawing Sheets

(51) Int. Cl.
*G06F 3/038* (2013.01)
*G06F 13/12* (2006.01)

(52) U.S. Cl.
CPC .... *G06F 13/124* (2013.01); *G06F 2203/0383* (2013.01)

(56) References Cited

U.S. PATENT DOCUMENTS

| | | |
|---|---|---|
| 7,237,101 B1 | 6/2007 | Dono |
| 8,935,437 B2 | 1/2015 | Lambert |
| 8,977,733 B1 | 3/2015 | Phuong et al. |
| 9,100,297 B2 | 8/2015 | DeHaan |
| 2004/0122989 A1 | 6/2004 | Hall |
| 2007/0011491 A1* | 1/2007 | Govindarajan |
| 2010/0138636 A1 | 6/2010 | Conus et al. |
| 2012/0331119 A1 | 12/2012 | Bose et al. |
| 2013/0151841 A1 | 6/2013 | McGraw |
| 2014/0280814 A1 | 9/2014 | Maity et al. |
| 2016/0014073 A1 | 1/2016 | Reddy et al. |

OTHER PUBLICATIONS

Slaight, T.; "Server Management Controllers, Sensors, and Tools," Mar. 1, 2001, 70 pps.

* cited by examiner

MANAGEMENT PROCESSOR USING CODE FROM PERIPHERAL DEVICE

BACKGROUND

Modern computing systems can include a standard configuration of components. Further, some computing systems can be modified by adding peripheral devices. For example, a computer server may include slots and/or interfaces to receive peripheral devices such as network interface cards (NICs), user input devices, storage devices, and so forth.

BRIEF DESCRIPTION OF THE DRAWINGS

Some implementations are described with respect to the following figures.

DETAILED DESCRIPTION

Figure 1:
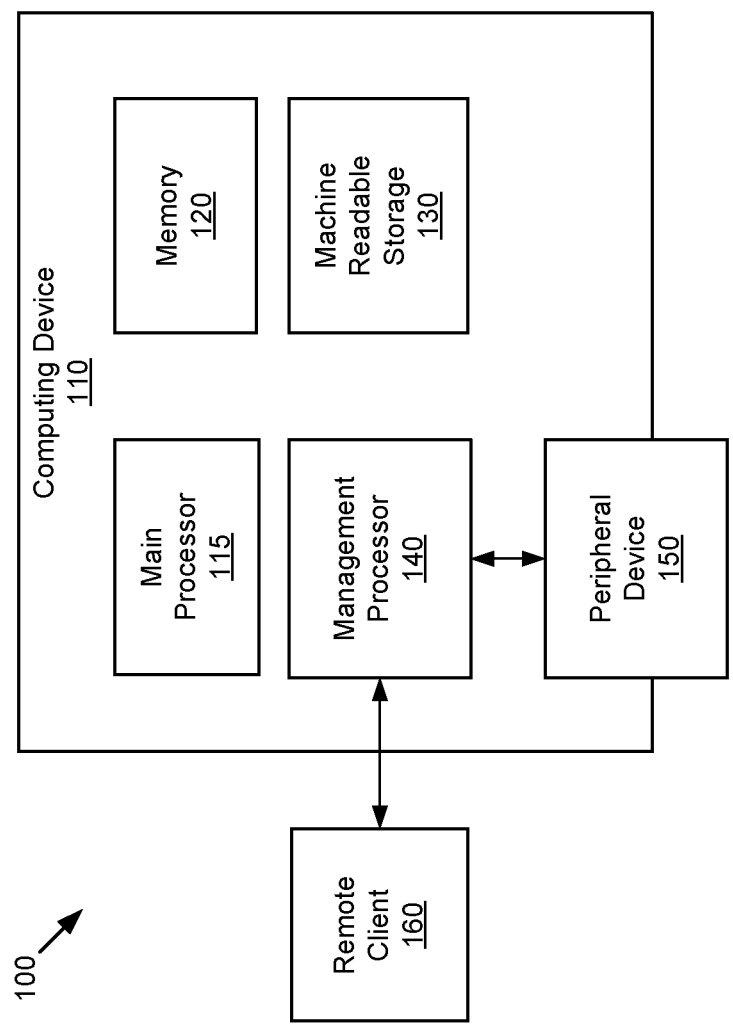
FIG. 1 is a schematic diagram of an example system, in accordance with some implementations.

A capability of a computing device may be modified or enhanced by coupling to the computing device a set of peripheral devices. Additionally, a computing device can include a management processor to remotely or locally manage a set of peripherals coupled to the computing device.

As used herein, a management processor can include a hardware processor that is dedicated for management of the computing device, and that can execute in a separate or isolated manner from the main processor of the computing system. An example of a management processor can include a baseboard management controller (BMC), which is a specialized microcontroller embedded on a motherboard of a computing device such as a server. A BMC can support the Intelligent Platform Management Interface (IPMI) architecture, which defines a set of common interfaces to computer hardware and firmware that system administrators can use to monitor health and manage a computing device. A BMC can manage the interface between system management software and hardware of the computing device. A BMC of a computing device can provide remote management access to the computing device, and may provide such remote management access over an out-of-band communication channel, which isolates management communication from communication of an operating system (OS) running on the computing device. In some instances, the BMC may enable lights-out management of the computing device, which provides remote management access (e.g., system console access) to the computing device regardless of whether the computing device is powered on, whether a primary network subsystem hardware is functioning, or whether an OS is operating or even installed.

Some management processors can include built-in logic to provide management (e.g., remote or local management) of a set of peripheral devices coupled to the computing device. However, the built-in logic of a management processor may not reflect or use all aspects of management that are available for a given peripheral device. For instance, a management processor may be older than a peripheral device, and thus the management processor may not be capable of accessing newer technology included in the peripheral device. In another example, a management processor may include a limited amount of memory or storage for programming, and thus cannot be updated to include updated built-in logic to provide management for various peripheral devices coupled to the computing device. Accordingly, a management processor may not provide some management actions that may be available with respect to a particular peripheral device.

In accordance with some implementations, examples are provided for a management interface for a peripheral device. As described further below, some implementations may include the management processor reading management code from a peripheral device installed or otherwise connected to a computing device. The management processor may execute the management code to provide a management application programming interface (API) accessible by a remote client. In some implementations, the remote client may use the management API to manage the peripheral device.

FIG. 1 shows a schematic diagram of an example system 100, in accordance with some implementations. As shown, in some implementations, the system 100 may include a computing device 110 and a remote client 160. The computing device 100 may be, for example, a computer, a portable device, a server, a network client, a communication device, etc. Further, the computing device 110 may be any grouping of related or interconnected devices, such as a blade server, a computing cluster, and the like.

In some implementations, the computing device 110 can include main processor 115, memory 120, machine-readable storage 130, and a management processor 140. Further, as shown in FIG. 1, the computing device 110 can be modified by adding or connecting one or more peripheral device(s) 150. The main processor 115 may be a hardware device that executes program instructions stored in the machine-readable storage 130. For example, the main processor 115 may be a microprocessor, a microcontroller, multiple processors, a microprocessor including multiple processing cores, and so forth. The memory 120 can be any type of computer memory (e.g., dynamic random access memory (DRAM), static random-access memory (SRAM), etc.).

In some implementations, the management processor 140 is a hardware device that is separate from the main processor 115, and that is dedicated to management of the computing device 110. For example, the management processor 140 may be a Baseboard Management Controller (BMC). In some implementations, the management processor 140 may conform to the Intelligent Platform Management Interface (IPMI) standard, such as described in the "Intelligent Platform Management Interface Specification, Second Generation" (v.2.0, Oct. 1, 2013).

In some implementations, the remote client 160 may be a computing device remotely communicating with the computing device 110. Further, the remote client 160 may include various hardware and/or software components (not shown). For example, the remote client 160 may include a hardware processor executing remote client software or firmware. However, other implementations are possible. For example, in some implementations, the remote client 160 may be software or firmware executed by the main processor 115.

In some implementations, the remote client 160 may interact with the management processor 140 to perform management of the computing system 110. In some examples, the data communications between the management processor 140 and the remote client 160 may use a dedicated management channel (referred to as "out-of-band communication"). In some implementations, the management processor 140 may be accessible to the remote client 160 even when the main processor 115 is switched off or inactive. In some examples, the management processor 140 may interface with one or more sensors (not shown) to monitor environmental conditions of the computing device 110. Further, in some examples, the management processor 140 may be embedded in or mounted on a motherboard (not shown) of the computing device 110.

In some implementations, the remote client 160 may interact with the management processor 140 to perform management actions for the peripheral device 150. Examples of management actions for the peripheral device 150 may include running a diagnostic test, upgrading software or firmware, controlling a power state, controlling device settings, reading device data, and so forth.

In some implementations, the peripheral device 150 can be a hardware module that can be removeably installed in a receptacle or slot within the computing device 110. For example, the peripheral device may be an interface card that is plugged into a card slot of the computing device, a hard drive that is inserted into a drive bay, and so forth. However, other implementations are possible. For example, the peripheral device 150 can also be external to the computing device 110. Examples of the management processor 140 and the peripheral device 150 are described further below with reference to FIG. 2.

Figure 2:
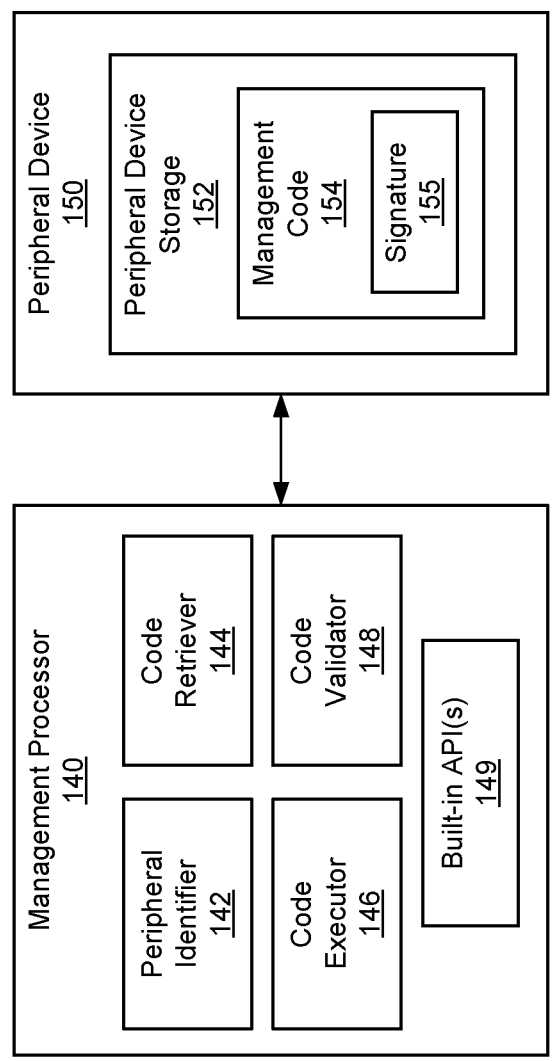
FIG. 2 is a schematic diagram of an example management processor and an example peripheral device, in accordance with some implementations.

Referring now to FIG. 2, shown is a schematic diagram of examples of the management processor 140 and the peripheral device 150, in accordance with some implementations. As shown, in some implementations, the peripheral device 150 may include a peripheral device storage 152. In some examples, the peripheral device storage 152 may be a non-volatile machine-readable storage device such as flash memory, read-only memory, hard-disk drive, magnetic tape, and so forth. In some implementations, the peripheral device storage 152 may persistently store management code 154. In some examples, the management code 154 may include a digital signature 155.

In some implementations, the management processor 140 may include a peripheral identifier 142, a code retriever 144, a code executor 146, a code validator 148, and built-in application programming interface (API)(s) 149. These components of the management processor 140 may be implemented using hardware (e.g., circuitry) or hardware combined with software (e.g., firmware).

In some implementations, the peripheral identifier 142 may identify or detect a peripheral device 150 installed in the computing device 110. For example, the peripheral identifier 142 may detect the installation of a peripheral device 150 (e.g., an interface card) in a slot or bay of the computing device 110.

The code retriever 144 may receive the management code 154 from the peripheral device 150. In some implementations, the code retriever 144 may read the management code 154 from the peripheral device 150. For example, the code retriever 144 may access the management code 154 in response to the peripheral identifier 142 detecting an installation of a peripheral device 150. In other implementations, the peripheral device 150 may send the management code 154 to the code retriever 144. For example, the peripheral device 150 may automatically send the management code 154 to the code retriever 144 in response to the peripheral device 150 being installed in the computing device 110.

In some implementations, the code retriever 144 may receive the management code 154 using the built-in API(s) 149. In some examples, the built-in API(s) 149 may provide a limited level of management that is generic to a particular class or type of peripheral device 150. For example, the built-in API(s) 149 may allow the management processor 140 to conduct some basic communication with standard network interface devices. Further, in some examples, the built-in API(s) 149 may provide some level of management that is generic across all classes or types of peripheral devices 150.

In some implementations, the code executor 146 may execute the management code 154 received by the code retriever 144. When executed by the code executor 146, the management code 154 may provide a management API (not shown in FIG. 2) at the management processor 140. The management API may be accessible by a remote client (e.g., remote client 160 shown in FIG. 1) to manage the peripheral device 150.

In some implementations, the code validator 148 may validate and/or authorize the management code 154 before execution by the code executor 146. In some examples, the code validator 148 may analyze the digital signature 155 to determine whether the management code 154 is provided by a trusted source. Further, in some examples, the code validator 148 may analyze user-provided information (e.g., user name and password) to determine whether the management code 154 is authorized to be executed by the management processor 140.

In some implementations, the code validator 148 may determine whether a license or key exists that grants access to the management code 154. The code validator 148 may only allow execution of the management code 154 if such a license or key can be identified. In some examples, the license or key may be included in a file stored in the computing device 110 (shown in FIG. 1).

In some examples, the code validator 148 may determine whether the management processor 140 is used in a secure environment, and may prevent execution of the management code 154 if the management processor 140 is used in a secure environment. In some examples, the determination as to whether the management processor 140 is used in a secure environment may be based on a hardware jumper or switch of the computing device 110, a flag/setting of an operating system, a flag/setting of a network environment, a flag/setting of an application executing on the computing device 110 (shown in FIG. 1), and so forth.

FIGS. 3A-3D are schematic diagrams of an example process for providing a management interface, in accordance with some implementations. Specifically, FIGS. 3A-3D illustrate four states or stages of an example operation using the devices and elements illustrated in FIGS. 1-2.

Figure 3A:
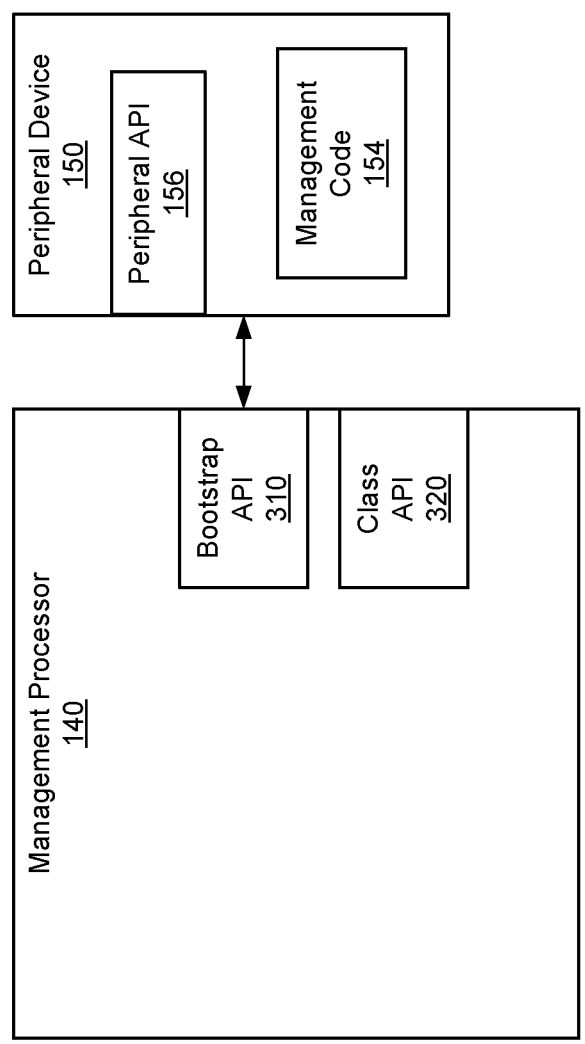
FIGS. 3A-3D are schematic diagrams of an example process for providing a management interface, in accordance with some implementations.

Referring now to FIG. 3A, shown is a first state of an example process for providing a management interface. In the example of FIG. 3A, the management processor 140 and the peripheral device 150 are included in the same computing device (e.g., computing device 100 shown in FIG. 1). In some implementations, the management processor 140 may include a bootstrap API 310 and a class API 320. The bootstrap API 310 and the class API 320 may be included in the built-in API(s) 149 (shown in FIG. 2). In some examples, the peripheral device 150 may include a peripheral API 156.

As shown in FIG. 3A, the bootstrap API 310 may communicate with the peripheral device 150, and may identify the class of the peripheral device 150 (e.g., device type, classification, etc.). In some implementations, the bootstrap API 310 may be used with all peripheral devices, and may identify the class of any peripheral device 150 installed in the same device as the management processor 140.

In some implementations, the class API 320 may be one of multiple class-level APIs, with each class-level APIs being used with a different class of peripheral devices. Thus, in the example of FIG. 3A, the identified class of the peripheral device 150 (determined by the bootstrap API 310) may be used to select the corresponding class API 320.

Figure 3B:
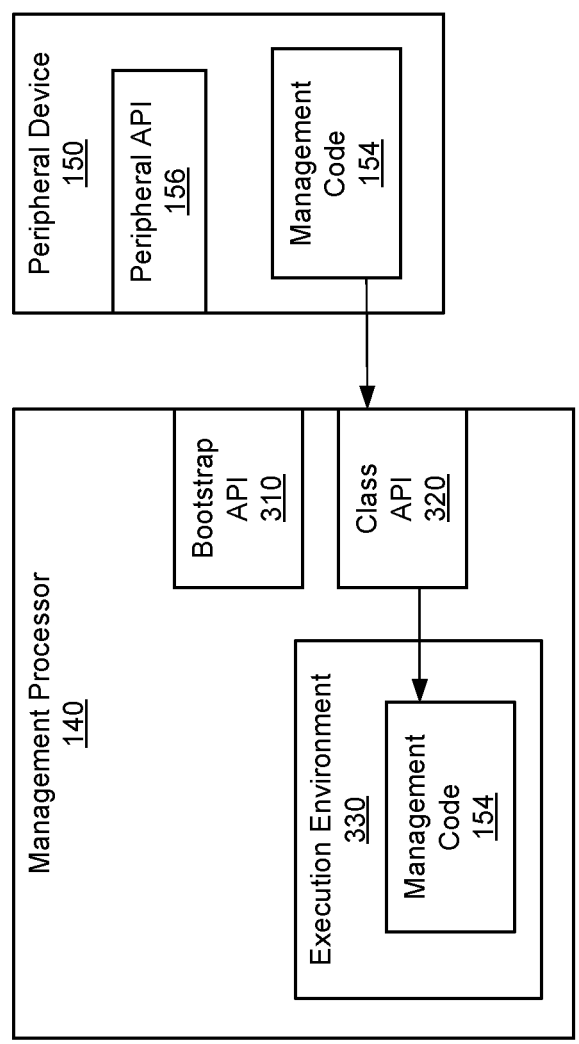

Referring now to FIG. 3B, shown is a second state of the example process. In the example of FIG. 3B, the class API 320 corresponds to the class of the peripheral device 150, and can thus provide some level of management of the peripheral device 150. As shown, the class API 320 may receive the management code 154 from the peripheral device 150, and may provide the management code 154 to be executed in an execution environment 330. In some implementations, the execution environment 330 may be a secure execution environment provided by the code executor 146 (shown in FIG. 2). For example, the execution environment 330 may be isolated from other process or programming of the management processor 140 and/or the computing device 110 (shown in FIG. 1).

Figure 3C:
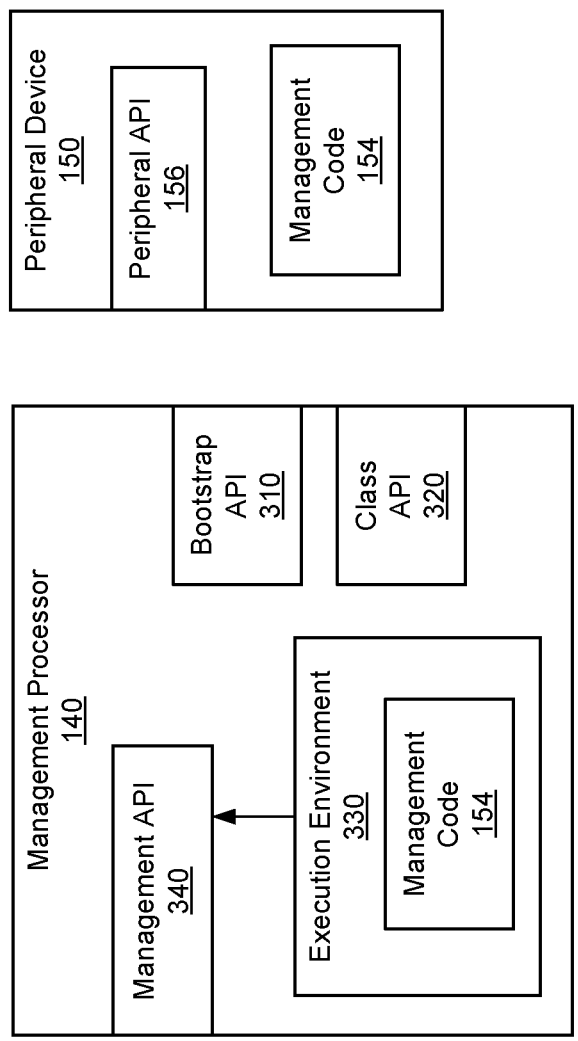

Referring now to FIG. 3C, shown is a third state of the example process. As shown in FIG. 3C, executing the management code 154 in the execution environment 330 provides a management API 340 at the management processor 140. In some implementations, the management API 340 may be registered by the management processor 140, and may be presented or exposed to other devices or clients.

Figure 3D:
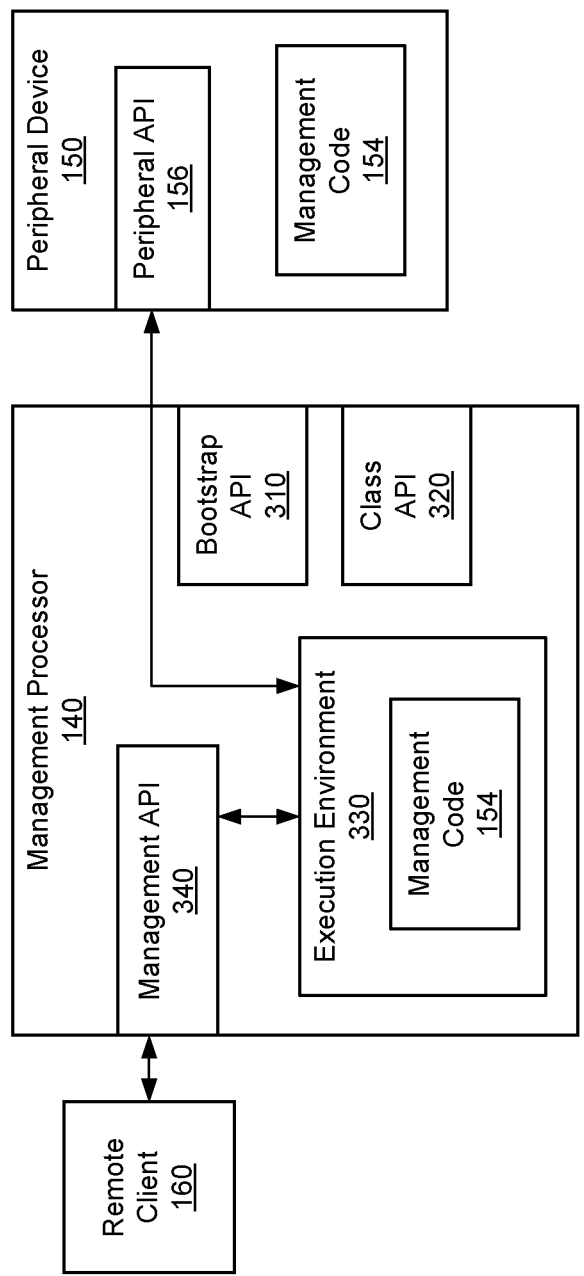

Referring now to FIG. 3D, shown is a fourth state of the example process. As shown in FIG. 3D, a remote client 160 may access the management API 340 to manage the peripheral device 150. In some implementations, when the remote client 160 makes a request to the management API 340, the management processor 140 processes the request using the management code 154 in the execution environment 330. Further, in some implementations, the management code 154 in the execution environment 330 may delegate the request to the peripheral API 156 included in the peripheral device 150, and thus cause a management action to be performed at the peripheral device 150.

In some implementations, the peripheral API 156 may be dedicated for managing the peripheral device 150. For example, the peripheral API 156 may provide management actions that are unique and/or proprietary to the peripheral device 150. In some implementations, the management code 154 may allow the remote client 160 to perform management actions that are not provided by the built-in programming of the management processor 140 (e.g., the built-in API(s) 149 shown in FIG. 2).

It is noted that, while FIGS. 1-3D show example implementations, other implementations are possible. For example, it is contemplated that the computing device 110 may include any number of peripheral devices 150. In another example, it is contemplated that the features of the bootstrap API 310 and the class API 320 may be combined into a single API. In still another example, it is contemplated that management processor 140 and the peripheral device 150 may include additional components and/or APIs. In yet another example, it is contemplated that the bootstrap API 310 could be implemented as two portions, with a first portion included in the management processor 140, and a second portion included in the peripheral device 150. Any of the features described above with reference to FIGS. 1-3D may combined and/or used with any other features described herein. Other combinations and/or variations are also possible.

Figure 4:
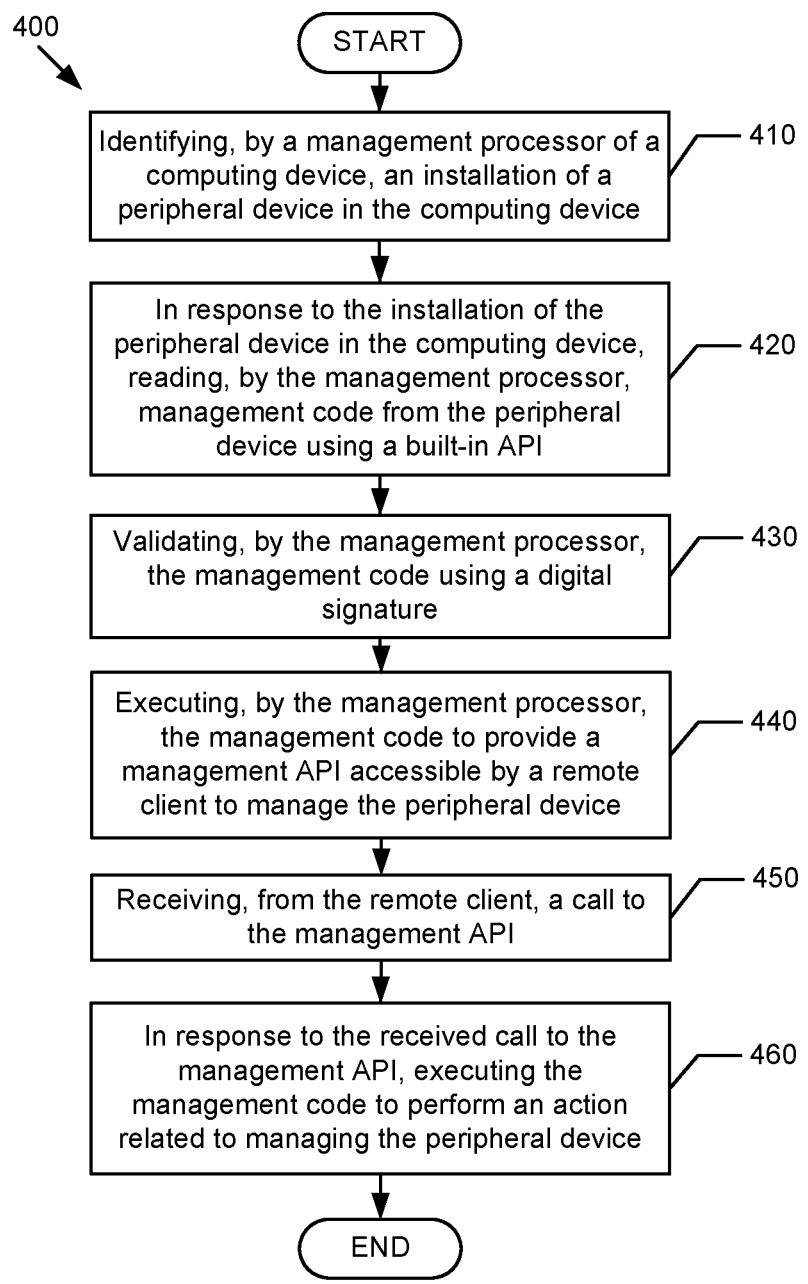
FIG. 4 is a flow diagram of an example process for providing a management interface, in accordance with some implementations.

Referring now to FIG. 4, shown is a process 400 for providing a management interface, in accordance with some implementations. The process 400 may be performed by the management processor 140 shown in FIGS. 1-3D. For the sake of illustration, details of the process 400 may be described below with reference to FIGS. 1-3D, which show examples in accordance with some implementations. However, other implementations are also possible.

At block 410, a management processor of a computing device may identify an installation of a peripheral device in the computing device. For example, referring to FIG. 1, the management processor 140 may identify an installation of the peripheral device 150 in the computing device 110.

At block 420, in response to the installation of the peripheral device in the computing device, the management processor may read management code from the peripheral device using a built-in API. For example, referring to FIG. 3B, the management processor 140 may read the management code 154 from the peripheral device 150 using the class API 320.

At block 430, the management processor may validate the management code using a digital signature. For example, referring to FIG. 2, the code validator 148 may validate the management code 154 using the digital signature 155.

At block 440, the management processor may execute the management code to provide a management API accessible by a remote client to manage the peripheral device. For example, referring to FIGS. 3C-3D, the management code 154 is executed in the execution environment 330 of the management processor 140, thus providing the management API 340. The management API 340 may be accessed by the remote device 160 to manage the peripheral device 150.

At block 450, a call to the management API may be received from the remote client. For example, referring to FIG. 3D, the management API 340 receives a request from the remote device 160.

At block 460, in response to the received call to the management API, the management code may be executed to perform an action related to managing the peripheral device. For example, referring to FIG. 3D, the management processor 140 processes the received request using the management code 154 in the execution environment 330. The management code 154 delegates the request to a peripheral API 156 included in the peripheral device 150, and may cause a management action to be performed at the peripheral device 150. After block 460, the process 400 is completed.

Figure 5:
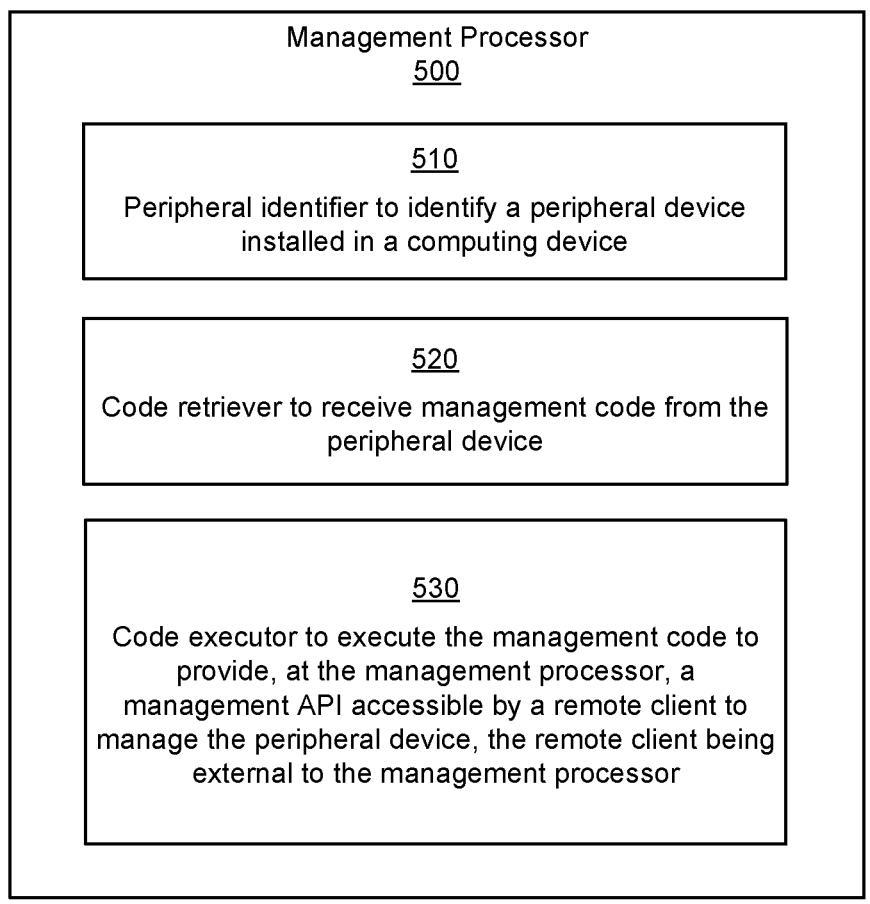
FIG. 5 is a schematic diagram of an example management processor, in accordance with some implementations.

Referring now to FIG. 5, shown is a schematic diagram of an example management processor 500. The management processor 500 may correspond generally to the management processor 140 shown in FIGS. 1-3D. As shown, the management processor 500 may include modules 510-530. The modules 510-530 may be implemented using hardware (e.g., circuitry) or hardware combined with software (e.g., firmware). For the sake of illustration, details of the modules 510-530 may be described below with reference to FIGS. 1-3D, which show examples in accordance with some implementations. However, other implementations are also possible.

Module 510 is a peripheral identifier to identify a peripheral device installed in a computing device. For example, referring to FIG. 2, the peripheral identifier 142 may identify or detect the installation of the peripheral device 150 in the computing device 110.

Module 520 is a code retriever to receive management code from the peripheral device. For example, referring to FIG. 2, the code retriever 144 may receive the management code 154 from the peripheral device 150. In some implementations, the code retriever 144 may read the management code 154 from the peripheral device 150. In other implementations, the peripheral device 150 may send the management code 154 to the code retriever 144. Further, in some examples, the code retriever 144 may receive the management code 154 using the built-in API(s) 149 of the management processor 140.

Module 530 is a code executor to execute the management code to provide, at the management processor, a management API accessible by a remote client to manage the peripheral device, with the remote client being external to the management processor. For example, referring to FIG. 2, the code executor 146 may execute the management code 154 received by the code retriever 144. When executed by the code executor 146, the management code 154 may provide a management API 340 (shown in FIGS. 3C-3D). The management API 340 may be accessible by the remote client 160 to manage the peripheral device 150.

Figure 6:
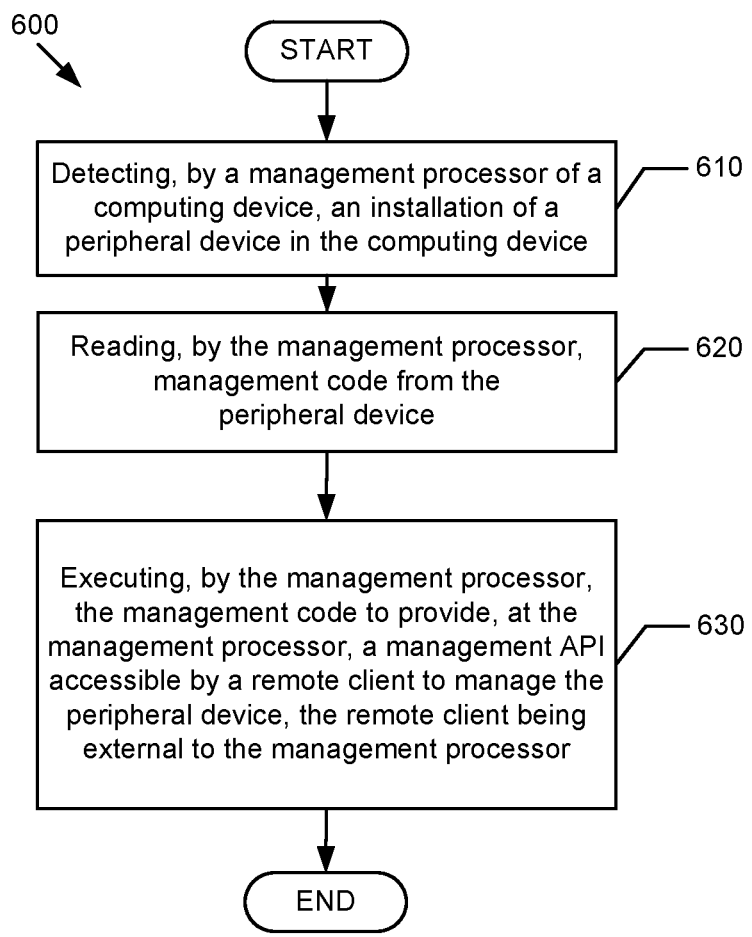
FIG. 6 is a flow diagram of an example process for providing a management interface, in accordance with some implementations.

Referring now to FIG. 6, shown is a process 600 for providing a management interface, in accordance with some implementations. The process 600 may be performed by the management processor 140 shown in FIGS. 1-3D. For the sake of illustration, details of the process 600 may be described below with reference to FIGS. 1-3D, which show examples in accordance with some implementations. However, other implementations are also possible.

At block 610, a management processor of a computing device may detect an installation of a peripheral device in the computing device. For example, referring to FIG. 1, the management processor 140 may detect the installation of the peripheral device 150 in the computing device 110.

At block 620, the management processor may read management code from the peripheral device. For example, referring to FIG. 2, the management processor 140 may read the management code 154 from the peripheral device 150 using the code retriever 144 and/or the built-in API(s) 149.

At block 630, the management processor may execute the management code to provide, at the management processor, a management API accessible by a remote client to manage the peripheral device, the remote client being external to the management processor. For example, referring to FIGS. 3C-3D, the management code 154 is executed by the management processor 140, thus providing the management API 340. The management API 340 may be accessed by the remote device 160 at the management processor 140 to manage the peripheral device 150. After block 630, the process 600 is completed.

Figure 7:
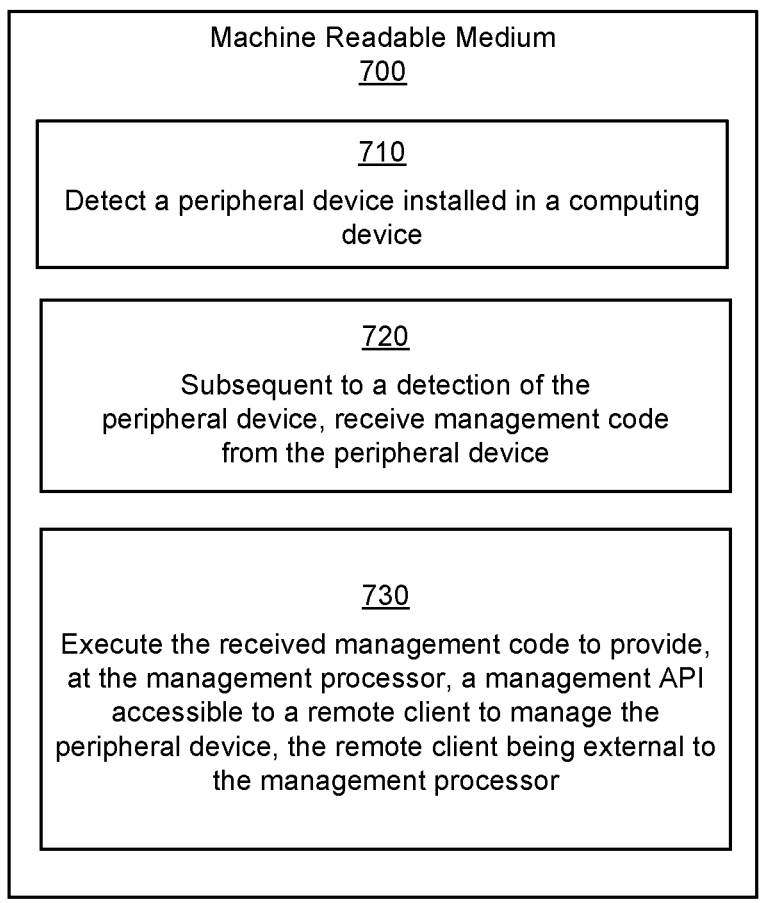
FIG. 7 is a diagram of an example machine-readable storage medium storing instructions in accordance with some implementations.

Referring now to FIG. 7, shown is a machine-readable storage medium 700 storing instructions 710-730, in accordance with some implementations. The instructions 710-730 can be executed by a processor (e.g., management processor 140 shown in FIGS. 1-3D). The memory machine-readable storage medium 700 can include non-transitory storage media such as hard drives, flash storage, optical disks, etc.

Instruction 710 may detect a peripheral device installed in a computing device. For example, referring to FIG. 1, the management processor 140 may detect an installation of the peripheral device 150 in the computing device 110.

Instruction 720 may, subsequent to the detection of the peripheral device, receive management code from the peripheral device. For example, referring to FIG. 2, the management processor 140 may receive the management code 154 from the peripheral device 150.

Instruction 730 may execute the received management code to provide, at the management processor, a management API accessible to a remote client to manage the peripheral device, the remote client being external to the management processor. For example, referring to FIGS. 3C-3D, executing the management code 154 provides the management API 340 at the management processor 140. The management API 340 may be accessed by the remote device 160 to manage the peripheral device 150.

As discussed above, examples are provided for a management interface for a peripheral device. Some implementations may include a management processor reading management code from a peripheral device installed in a computing device. The management processor may execute the management code to provide a management API accessible by a remote client. In some implementations, the remote client may use the management API to manage the peripheral device. In this manner, a management processor can provide management for any number of peripheral devices, and without having to include built-in programming directed to those specific peripheral devices.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A management processor comprising:
   a peripheral identifier to identify a peripheral device installed in a computing device;
   a code retriever to receive management code from the peripheral device in response to identifying the peripheral device; and a code executor to execute the management code to:
  generate a management application programming interface (API) accessible by a remote client external to the management processor;
  receive requests from the remote client external to the management processor via the API; and
  perform management actions on the peripheral device indicated by the received requests using the management code, wherein the management actions included in the management code are not originally included in the management processor.

2. The management processor of claim 1, wherein the code retriever is to read the management code in response to an installation of the peripheral device in the computing device.

3. The management processor of claim 1, wherein the code retriever is to read the management code using a built-in API included in the management processor.

4. The management processor of claim 1, further comprising:
  a code validator to validate the management code prior to executing the management code.

5. The management processor of claim 4, wherein the code validator is to validate the management code using a digital signature.

6. The management processor of claim 1, wherein the code executor is to:
  receive, from the remote client, a call to the management API; and
  in response to the received call to the management API, execute the management code to perform an action related to managing the peripheral device.

7. The management processor of claim 1, wherein the management processor is integrated into the computing device, and wherein the management code is stored in a non-volatile storage of the peripheral device.

8. A method comprising:
  detecting, by a management processor of a computing device, an installation of a peripheral device in the computing device;
  reading, by the management processor, management code from the peripheral device in response to detecting the peripheral device; and
  executing, by the management processor, the management code to:
    generate a management application programming interface (API) accessible by a remote client external to the management processor;
    receive requests from the remote client external to the management processor via the API; and
    perform management actions on the peripheral device indicated by the received requests using the management code, wherein the management actions included in the management code were not previously included in the management processor.

9. The method of claim 8, further comprising:
  reading, by the management processor, the management code using a built-in API included in the management processor.

10. The method of claim 9, wherein the management processor to validate the management code prior to executing the management code.

11. The method of claim 10, wherein the management code is validated using a digital signature.

12. The method of claim 9, wherein the built in API comprises a bootstrap API and a class API.

13. The method of claim 12, wherein the bootstrap API identifies a class of the peripheral device.

14. The method of claim 13, wherein the class API comprises at least one of a plurality of class APIs to communicate with the peripheral device based on the identified class.

15. The method of claim 8, further comprising:
  receiving, by the management processor, a call from the remote client to the management API; and
  in response to the call to the management API, executing, by the management processor, the management code to perform an action related to managing the peripheral device.

16. The method of claim 8, further comprising:
  validating, by the management processor, the management code using a digital signature.

17. An article comprising a non-transitory machine-readable storage medium storing instructions that, when executed by a management processor, cause the management processor to:
  detect a peripheral device installed in a computing device;
  receive management code from the peripheral device in response to detecting the peripheral device; and
  execute the received management code to:
    generate a management application programming interface (API) accessible by a remote client external to the management processor via an out-of-band communication channel;
    receive requests from the remote client external to the management processor via the API; and
    perform management actions on the peripheral device indicated by the received requests using the management code, wherein the management actions included in the management code are not included in the management processor.

18. The article of claim 17, wherein the instructions cause the management processor to validate the management code prior to executing the management code.

19. The article of claim 17, wherein the instructions cause the management processor to:
  receive, from the remote client, a call to the management API; and
  in response to the received call to the management API, execute the management code to perform an action related to managing the peripheral device.

20. The article of claim 17, wherein the management processor is integrated into the computing device and is dedicated to management of the computing device, and wherein the management code is stored in a non-volatile storage of the peripheral device.

* * * * *